United States Patent
Isomichi et al.

(10) Patent No.: US 6,545,446 B2
(45) Date of Patent: Apr. 8, 2003

(54) CELLULAR PHONE EQUIPPED WITH A CHARGING FUNCTION

(75) Inventors: Yasuhiro Isomichi, Kakegawa (JP); Hiroyuki Oku, Yokohama (JP)

(73) Assignee: Matsushita Electric Industiral Co., Ltd., Osaka (JP)

(*) Notice: Subject to any disclaimer, the term of this patent is extended or adjusted under 35 U.S.C. 154(b) by 0 days.

(21) Appl. No.: 10/113,020

(22) Filed: Mar. 29, 2002

(65) Prior Publication Data

US 2002/0140398 A1 Oct. 3, 2002

(30) Foreign Application Priority Data

Mar. 30, 2001 (JP) .......................................... 2001-100235

(51) Int. Cl.[7] .................................................. H02J 7/00
(52) U.S. Cl. ........................................ 320/128; 320/127
(58) Field of Search ................................ 320/128, 127, 320/135, 136, 137; 324/426, 427

(56) References Cited

U.S. PATENT DOCUMENTS

| | | | | |
|---|---|---|---|---|
| 5,028,860 A | * | 7/1991 | Amano | 320/164 |
| 6,002,237 A | * | 12/1999 | Gaza | 320/116 |
| 6,037,750 A | * | 3/2000 | Von Novak | 320/128 |

\* cited by examiner

*Primary Examiner*—Michael Sherry
*Assistant Examiner*—Lawrence Luk
(74) *Attorney, Agent, or Firm*—Pearne & Gordon LLP

(57) ABSTRACT

In a cellular phone of the invention, a rechargeable battery is used as a power supply to feed power to a second load and a regulator via a charging current detector circuit and a charging switch when an external power is not fed. The power is converted to an optimum voltage by the regulator and fed to a CPU and a load. When the external power is fed, the rechargeable battery is recharged and the charging current is detected by the charging current detector circuit. While a variation in the load is caused by a change in the operating state of the cellular phone from the call termination ready state to conversation state, or while a variation in the second load is caused by lighting of a key backlight, the current flowing in the charging current detector circuit stays constant and the correct charging current can be detected exclusively.

7 Claims, 2 Drawing Sheets

CELLULAR PHONE EQUIPPED WITH A CHARGING FUNCTION

BACKGROUND OF THE INVENTION

1. Field of the Invention

The present invention relates to a cellular phone equipped with a charging function, and in particular to a cellular phone equipped with a charging function that can correctly measure a charging current.

2. Description of the Related Art

Recent cellular phones are characterized by the compact size of main body and compact peripheral accessories. A charging circuit among the peripheral accessories is generally incorporated into a cellular phone main body and is recharged only when connected to an external power source via a connector.

FIG. 4 shows a block diagram of a general cellular phone equipped with a charging function. In FIG. 4, an external power source 1 is means for receiving power from an external source and is connected to a charging adapter, a charging stand, a car-mounted connector, or such. A rechargeable battery 2 is a lithium-ion battery, a nickel-hydrogen battery, or such. A charging current detector circuit 3 is means for monitoring a voltage across resistors and detecting a corresponding current value. A charging switch 4 is means for adjusting a charging current by "on", "half-on", and "off" operations. A regulator 5 is means for converting a voltage from the external power source 1 or the rechargeable battery 2 to an optimum operating voltage and supplying the operating voltage to a CPU 6 and a load 7-1. The load 7-1 is a receiver circuit, a transmitter circuit, and a synthesizer circuit, or such. The CPU 6 is means for controlling the charging current based on the current value monitored by the charging current detector circuit 3 and the voltage and type of the rechargeable battery 2. A load 7-2 is a backlight for an LCD and keys.

Operation of the related art cellular phone equipped with a charging function will be described. In charging, the charging switch 4 is in the on or half-on state. In the meantime a current flows through the charging current detector circuit 3 to charge the rechargeable battery 2. The external power source 1 is used as a power supply for operation of a cellular phone such as making calls, and supplied to each section though the regulator 5. In this practice, the current is also supplied to each section via the charging current detector circuit 3. When recharging is complete, the charging switch 4 is turned off and the rechargeable battery 2 is used as a power supply for the cellular phone.

In general, in a cellular phone equipped with a charging function, a detected current, which flow through the charging current detector circuit, is variable when the cellular phone is operated during charging. It is caused of that all of operating current occurred by the operation also flow through the charging current detector circuit. Therefore, the CPU must discriminate the current operating state of the cellular phone and correct the current value accordingly, such as subtracting the current consumed by the cellular phone from the charging current. Nevertheless, it is quite cumbersome to perform the correction since a cellular phone is operated in various operating modes. When the recharging is about to complete, the current consumption of the cellular phone is much larger than the charging current, thus causing a larger error in the detected current. As a result, a related cellular phone equipped with a charging function has a problem that the charging current cannot be measured correctly.

SUMMARY OF THE INVENTION

The invention aims to solve the aforementioned problem and to provide a cellular phone in which a current flowing in a charging current detector circuit stays constant and a charging current is detected correctly even when the cellular phone is operated during recharging.

In order to solve the problems, the invention provides a cellular phone equipped with a charging function including means for connecting to an external power source, a rechargeable battery, a charging current detector circuit and a regulator for converting a voltage from the external power source or the rechargeable battery to an optimum voltage. In the cellular phone, the charging current detector circuit is connected between the rechargeable battery and the regulator and that the external power source is connected between the regulator and the charging current detector circuit. With this configuration, a current flowing in the charging current detector circuit stays constant even when the cellular phone is operated during recharging, thereby correctly detecting the charging current.

Besides, one end of the charging current detector circuit is connected the rechargeable battery alone. With this configuration, it is not necessary to correct the detected charging current thus simplifying the charging control means.

The cellular phone further includes a charging switch for controlling a charging current. The charging switch is provided between the charging current detector circuit and the rechargeable battery or between the external power source and the charging current detector circuit. With each of the configurations, it is possible to avoid discharge of the rechargeable battery until the external power source is removed.

Moreover, the cellular phone further includes an external power detector circuit for detecting a power fed from the external power source and a short circuit for short-circuiting the charging current detector circuit when the external power detector circuit does not detect a power fed from an external power source. With this configuration, it is possible to eliminate a power loss caused by the charging current detector circuit.

Additionally, The cellular phone further includes a load having at least a backlight circuit. The load is connected between the external power source and the regulator. With this configuration, it is possible to reject the change of charging current caused by the load variation. (for example backlight on and off)

DETAILED DESCRIPTION OF THE PREFERRED EMBODIMENTS

Embodiments of the invention will be described referring to FIGS. 1 through 3.

(First Embodiment)

The first embodiment of the invention provides a cellular phone equipped with a charging function in which a charging current detector circuit is arranged between a regulator and a rechargeable battery and an external power source is connected between the regulator and the charging current detector circuit.

Figure 1:
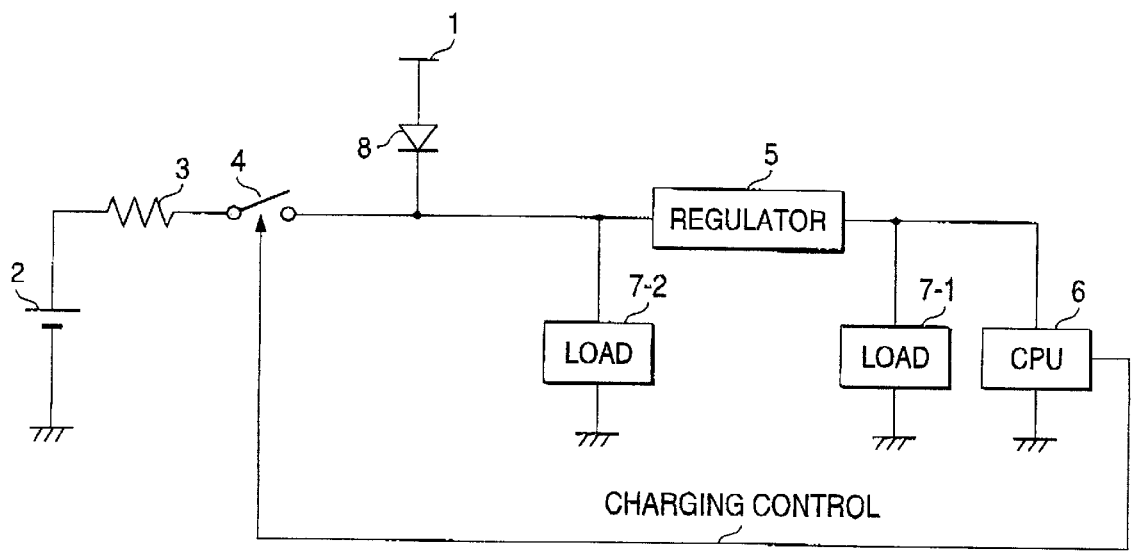
FIG. 1 is a functional block diagram showing a configuration of a charging circuit according to the first embodiment of the invention.

FIG. 1 is a functional block diagram showing a configuration of a cellular phone equipped with a charging function according to the first embodiment of the invention. In FIG. 1, an external power source 1 is means for receiving power from an external source and is connected to means for connecting to an external power source, for example, a power adapter, a chare stand, a car-mounted connector, or such. A rechargeable battery 2 is a lithium-ion battery, a nickel-hydrogen battery, or such. A charging current detector circuit 3 is means for detecting a current value by monitoring a voltage across resistors. A charging switch 4 is means for adjusting a charging current by "on", "half-on", and "off" operations. A regulator 5 is means for converting a voltage from the external power source 1 or the rechargeable battery 2 to an optimum operating voltage and for supplying the operating voltage to a CPU 6 and a load 7-1. The load 7-1 is a first load that corresponds to a receiver circuit, a transmitter circuit, a synthesizer circuit, or such. The CPU 6 is means for controlling the entire cellular phone such as controlling the charging current based on the current value monitored by the charging current detector circuit 3 and the voltage and type of the rechargeable battery 2. A load 7-2 is a second load that corresponds to a backlight for a display LCD (not shown), keys (not shown), an LED for incoming call notification, an LED for charging notification, a buzzer, a vibrator, or such. A diode 8 is means for preventing inversion of the power.

Operation of the cellular phone equipped with a charging function, which is configured as mentioned above, according to the first embodiment of the invention will be described with referring to FIG. 1. In the situation that the rechargeable battery 2 is connected and the external power source 1 is not connected, the rechargeable battery 2 is used as a power source and feeds power to the second load 7-2 and the regulator 5 through the charging current detector circuit 3 and the charging switch 4. The power is also fed to the CPU 6 and the load 7-1 after it is converted to an optimum voltage by the regulator 5.

Assume that the external power source 1 is fed to the cellular phone while the cellular phone is placed on a charging stand. In this case, there are three current paths. They are the first path from the external power source 1 to the second load 7-2 through the diode 8, the second path from the external power source 1 to the CPU and the load 7-1 through the diode 8 and the regulator 5 that converts the power to an optimum voltage, and the third path from the external power source 1 to the rechargeable battery 2 through the diode 8, the charging switch 4, and the charging current detector circuit 3. In this practice, the rechargeable battery 2 is recharged and the charging current is detected by the charging current detector circuit 3. Assuming, for example, the resistance value of the charging current detector circuit 3 is 0.15 [$\Omega$] and the voltage across resistors read by the CPU 6 is 150 [mV], the current is calculated as 1 [A]. Since it is possible to reduce the power loss, a smaller resistance value is favorable. Using too small a resistance value, however, fails to obtain a more accurate resistance value.

In the above configuration, the current flowing in the charging current detector circuit 3 stays constant and the charging current can be detected exclusively while a variation in the load 7-1 is caused by a change in the operating state of the cellular phone from the call termination ready state to conversation state, or while a variation in the second load 7-2 is caused by lighting of a key backlight.

The charging current detector circuit 3 and the charging switch 4 may be arranged in reversed positions. The power voltage may not be applied to the regulator 5 while the cellular phone power is turned off.

Moreover, PA with a large load (not shown) may be connected between the rechargeable battery 2 and the charging current detector circuits 3. By connecting PA with a large load to a rechargeable battery 2 side, the power loss at the time of current flowing the charging current detection circuit 3 of PA can be suppressed. In this case, although the current of PA will be added to the current of the charging current detector circuit 3 only during a conversation state, if the charging current under conversation state is disregarded, there will be no necessity for charging current compensation.

As mentioned above, in the first embodiment of the invention, a cellular phone equipped with a charging function is characterized in that a charging current detector circuit is connected between a rechargeable battery and a regulator and that an external power source is connected between the regulator and the charging current detector circuit. With this configuration, a current flowing in the charging current detector circuit stays constant even when the cellular phone is operated during recharging, thereby correctly detecting the charging current.

(Second Embodiment)

The second embodiment of the invention provides a cellular phone equipped with a charging function that short-circuits the charging current detector circuit in the case that an external power source is not connected.

Figure 2:
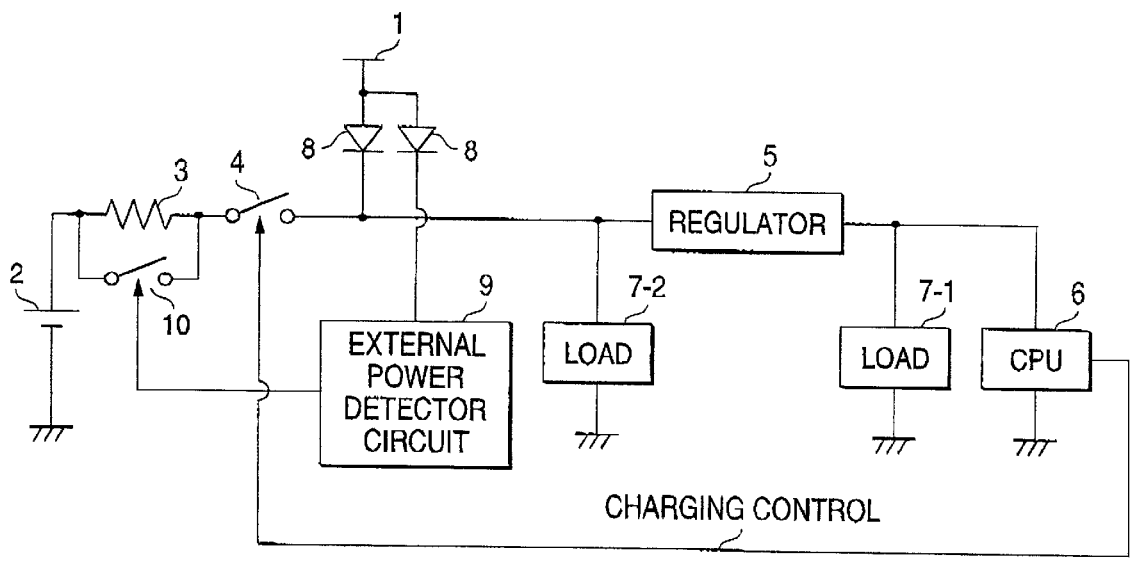
FIG. 2 is a functional block diagram showing a configuration of a charging circuit according to the second embodiment of the invention.

FIG. 2 is a functional block diagram showing a configuration of a cellular phone equipped with a charging function according to the second embodiment of the invention. In FIG. 2, elements are the same as those in the first embodiment, except an external power detector circuit 9 and a short circuit 10. The external power detector circuit 9 is means for detecting whether the external power source 1 is connected. The short circuit 10 is a MOSFET switch that short-circuits the charging current detector circuit 3 when the external power detector circuit 9 does not detect the external power source.

Operation of a cellular phone equipped with a charging function, which is configured as mentioned above, according to the second embodiment of the invention will be described referring to FIG. 2. While the rechargeable battery 2 is connected and the external power source 1 is not connected, the external power detector circuit 9 does not detect the external power source 1. This causes the short circuit 10 to operate thus short-circuiting the charging current detector circuit 3. Thus, it is possible to eliminate a loss caused by the charging current detector circuit 3 in the path from the rechargeable battery 2 to the regulator 5.

Assume that the external power source 1 is fed while the cellular phone is placed on a charging stand. The external power detector circuit 9 detects the external power source 1 and opens the short circuit 10 thus causing the charging current detector circuit 3 to operate. The charging current is fed to the rechargeable battery 2 via the charging current detector circuit 3. This operation is the same as that in the first embodiment.

The charging current detector circuit 3 and the charging switch 4 may be arranged in reversed positions. The power source may be disconnected from the regulator 5 while the cellular phone power is turned off.

As mentioned above, in the second embodiment of the invention, a cellular phone equipped with a charging function is characterized in that the charging current detector circuit 3 is short-circuited in case the external power source is not connected. This eliminates the power loss caused by the charging current detector circuit 3.

(Third Embodiment)

The third embodiment of the invention provides a cellular phone equipped with a charging function in which a regulator is connected to a rechargeable battery and loads including a backlight or such connected in a side of an external power source.

Figure 3:
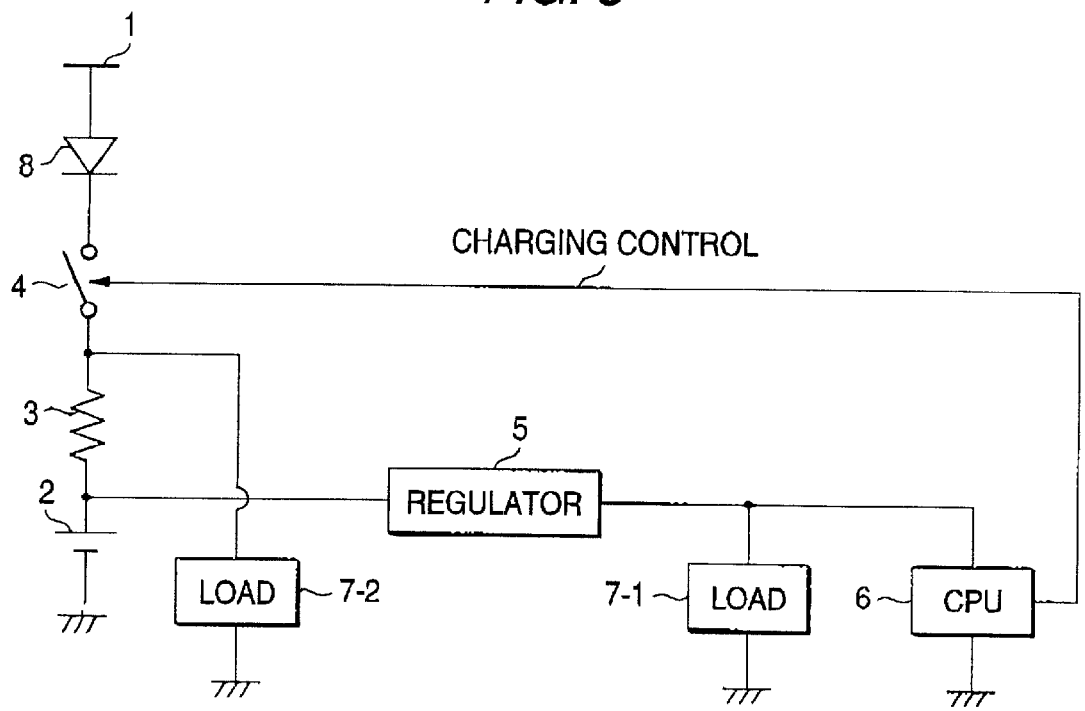
FIG. 3 is a functional block diagram showing a configuration of a charging circuit according to the third embodiment of the invention.
Figure 4:
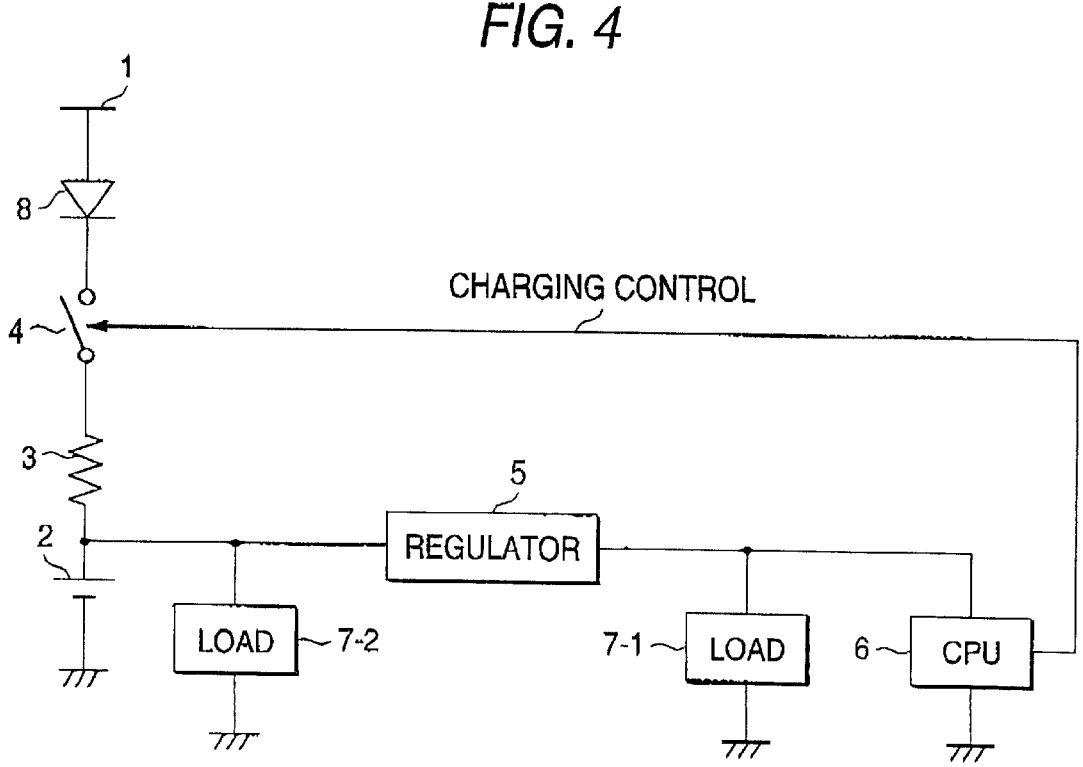
FIG. 4 is a functional block diagram showing a configuration of a related art charging circuit.

FIG. 3 is a functional block diagram showing a configuration of a cellular phone equipped with a charging function according to the third embodiment of the invention. In FIG. 3, an external power source 1 through a diode 8 are the same as those in the first and second embodiments. A regulator 5 is connected between a charging current detector circuit 3 and a rechargeable battery 2. A load 72 is connected between a charging switch 4 and the charging current detector circuit 3.

Operation of a cellular phone equipped with a charging function, which is configured as mentioned above, according to the third embodiment of the invention will be described referring to FIG. 3. While the rechargeable battery 2 is connected and the external power source 1 is not connected, the rechargeable battery 2 is used as a power source to feed power to the regulator 5. The power is fed to the second load 7-2 through the charging current detector circuit 3. Though a small loss is generated when the current to the second load 7-2 flows through the charging current detector circuit 3, it is possible to solve this problem by short-circuiting the charging current detector circuit 3 while the external power source 1 is not used, same as the second embodiment. It is also possible to solve the above problem by what the power voltage may not be applied to the regulator 5 while the cellular phone power is turned off.

Assume that the external power source 1 is fed while the cellular phone is placed on a charging stand. In this case, there are three current paths. They are a first path from the external power source 1 to the second load 72 through the diode 8, a second path from the external power source 1 to the CPU 6 and the load 7-1 through the diode 8, the charging current detector circuit 3, and the regulator 5 in which the power is converted to an optimum voltage, and a third path to the rechargeable battery 2. In this practice, the rechargeable battery 2 is recharged and the charging current detector circuit 3 detects the charging current.

In the configuration mentioned above, if the load 7-1 changes caused by a change in the operating state of the cellular phone from the call termination ready state to conversation state, it is necessary to correct the detected charging current. However, while the key backlight is turned on to cause a variation in the second load 7-2, the current flowing in the charging current detector circuit 3 stays constant. Therefore, a burden for correcting the charging current is small. Moreover, an error in the detection of the charging current is small because the current path using a large current such as that for turning on the key backlight does not pass through the charging current detector circuit 3.

The power contains residual ripple since the power is directly fed to the second load 7-2 from the external power source 1. Nevertheless, the ripple has no effect on the transmission/reception characteristics of the cellular phone because the second load 7-2 is an LED, a buzzer, a vibrator, or such.

As mentioned above, in the third embodiment of the invention, a cellular phone equipped with a charging function is characterized in that a regulator is connected to a rechargeable battery and loads including a backlight are connected to an external power source. This lightens the burden for correcting the charging current.

Considering the circumstances mentioned above, it is clear that a cellular phone of the invention provides advantages. One of the advantages is that the charging current is correctly detected even when the cellular phone is operated during recharging. It is caused by that a current flowing in the charging current detector circuit stays constant. Another advantage is that test items in the development process are reduced thus shortening the development period. Those effects are realized by a characteristic configuration of the cellular phone equipped with a charging function including means for connecting to an external power source, a rechargeable battery, a charging current detector circuit and a regulator for converting a voltage from the external power source or the rechargeable battery to an optimum voltage. The configuration is characterized in that the charging current detector circuit is connected between the rechargeable battery and the regulator and the external power source is connected between the regulator and the charging current detector circuit.

Another advantage is that charging control means can be simplified because it is not necessary to correct the detected charging current. This advantage is provided by a configuration that one end of the charging current detector circuit is connected only a rechargeable battery.

Another advantage is that it is possible to avoid discharge of the rechargeable battery until the external power source is removed. This effect is realized by a such configuration that charging switch is connected between the charging current detector circuit and the rechargeable battery or between the external power source and the charging current detector circuit.

Also, the cellular phone further includes an external power detector circuit for detecting a power fed from an external power source and a short circuit for short-circuiting the charging current detector circuit when the external power detector circuit does not detect a power fed from an external power source. This configuration provides an advantage that it is possible to eliminate a power loss caused by the charging current detector circuit.

A load including at least a backlight circuit is connected between the external power source and the regulator. This provides an advantage that it is possible to reject the change of charging current caused by the load variation. (for example backlight on and off)

While only three certain embodiments of the invention have been specifically described herein, it will be apparent that numerous modifications may be made thereto without departing from the spirit and scope of the invention.

What is claimed is:

1. A cellular phone equipped with a charging function comprising:
    means for connecting to an external power source;
    a rechargeable battery;
    a charging current detector circuit; and
    a regulator for converting a voltage from an external power source and said rechargeable battery to an optimum voltage; and
    wherein said charging current detector circuit is connected between said rechargeable battery and said regulator, and wherein said external power source is connected between said regulator and said charging current detector circuit.

2. The cellular phone according to claim 1, wherein no element is connected to one end of said charging current detector circuit except said rechargeable battery.

3. The cellular phone according to claim 1, further comprising:

a charging switch for controlling a charging current provided between said charging current detector circuit and said rechargeable battery.

4. The cellular phone according to claim 1, further comprising:

a charging switch for controlling a charging current provided between said external power source and said charging current detector circuit.

5. The cellular phone according to claim 1, further comprising:

an external power detector circuit for detecting a power fed from the external power source; and a short circuit for short-circuiting said charging current detector circuit when said external power detector circuit does not detect a power fed from said external power source.

6. The cellular phone according to claim 1, further comprising:

a load including at least a backlight circuit and connected between said external power source and said regulator.

7. A cellular phone charging system comprising:

an external power source; and a cellular phone equipped with a charging function including:

means for connecting to an external power source a rechargeable battery, a charging current detector circuit, and a regulator for converting a voltage from an external power source and said rechargeable battery to an optimum voltage; and wherein said charging current detector circuit is connected between said rechargeable battery and said regulator, and wherein said external power source is connected between said regulator and said charging current detector circuit.

* * * * *